(12) United States Patent
Hayashi et al.

(10) Patent No.: US 11,845,210 B2
(45) Date of Patent: Dec. 19, 2023

(54) INJECTION MOLDING APPARATUS AND CAP MEMBER

(71) Applicant: SEIKO EPSON CORPORATION, Tokyo (JP)

(72) Inventors: Riona Hayashi, Shiojiri (JP); Kenta Anegawa, Matsumoto (JP); Kakeru Sasagawa, Matsumoto (JP); Hiroki Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 79 days.

(21) Appl. No.: 17/176,753

(22) Filed: Feb. 16, 2021

(65) Prior Publication Data
US 2021/0260798 A1   Aug. 26, 2021

(30) Foreign Application Priority Data

Feb. 20, 2020   (JP) ................................ 2020-027006

(51) Int. Cl.
*B29C 45/27* (2006.01)
*B29C 45/78* (2006.01)

(52) U.S. Cl.
CPC .......... *B29C 45/2701* (2013.01); *B29C 45/78* (2013.01); *B29C 2045/272* (2013.01); *B29C 2045/2724* (2013.01); *B29C 2945/76531* (2013.01); *B29C 2945/76755* (2013.01); *B29K 2995/0013* (2013.01)

(58) Field of Classification Search
None
See application file for complete search history.

(56) References Cited

U.S. PATENT DOCUMENTS

| 2002/0189781 A1* | 12/2002 | Shibata | B22D 17/2272 164/121 |
| 2014/0117576 A1* | 5/2014 | Hanaoka | B29C 45/2669 425/548 |
| 2014/0302192 A1* | 10/2014 | Spuller | B29C 45/278 425/549 |

(Continued)

FOREIGN PATENT DOCUMENTS

| JP | H05261763 A | 10/1993 |
| JP | H06143358 A | 5/1994 |

(Continued)

OTHER PUBLICATIONS

English translation of JP 2009269182A (Year: 2009).*
Office Action for JP Patent Application No. JP2020-027006, dated Oct. 17, 2023, 4 pages of Office Action.

*Primary Examiner* — Kelly M Gambetta
*Assistant Examiner* — Virak Nguon
(74) *Attorney, Agent, or Firm* — CHIP LAW GROUP

(57) ABSTRACT

An injection molding apparatus including a fixed die including a gate via which a molding material flows in, a movable die that forms along with the fixed die a cavity and separates from the fixed die at a point of time of mold opening, an open-gate hot runner that includes a nozzle including a channel that guides the molding material to the gate and a heater that heats the channel, the hot runner being attachable to and detachable from the fixed die, and a cap member that is disposed between the fixed die and the hot runner and has a melting point higher than a melting point of the molding material.

12 Claims, 13 Drawing Sheets

(56) References Cited

U.S. PATENT DOCUMENTS

2020/0023562 A1    1/2020  Anegawa et al.

FOREIGN PATENT DOCUMENTS

| JP | 2002316342 A |   | 10/2002 | | |
|----|--------------|---|---------|---|---|
| JP | 2009269182 A | * | 11/2009 | ............. | B29C 31/04 |
| JP | 2012020472 A |   | 2/2012  | | |
| JP | 2020011488 A |   | 1/2020  | | |

* cited by examiner

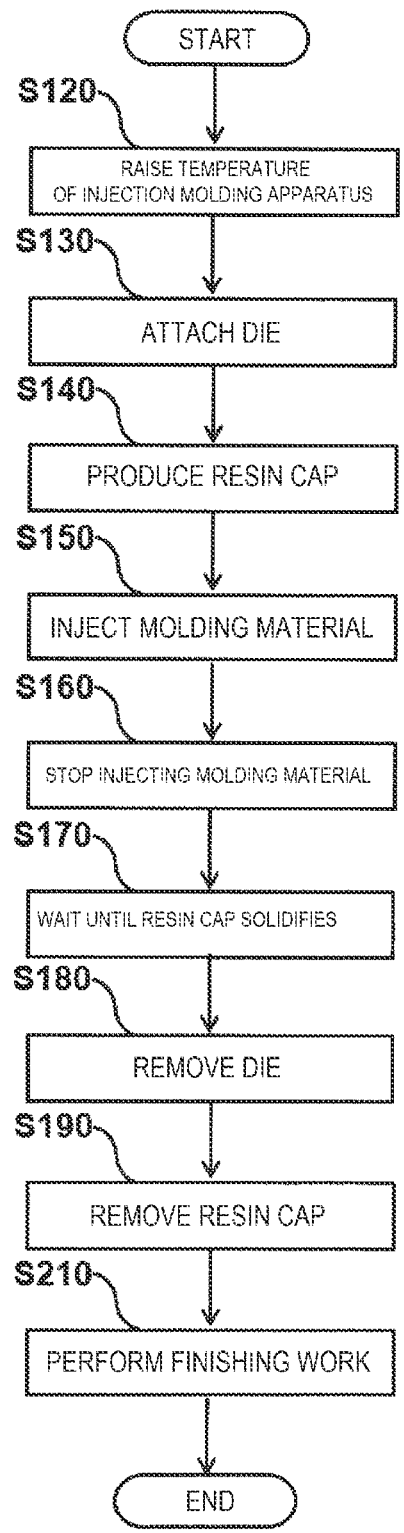

INJECTION MOLDING APPARATUS AND CAP MEMBER

The present application is based on, and claims priority from JP Application Serial Number 2020-027006, filed Feb. 20, 2020, the disclosure of which is hereby incorporated by reference herein in its entirety.

BACKGROUND

1. Technical Field

The present disclosure relates to an injection molding apparatus and a cap member.

2. Related Art

Injection molding apparatuses that inject a molding material from a hot runner into a cavity as a die formed of a fixed die and a movable die and perform molding injection have been used. Some of the injection molding apparatuses include what is called an open-gate hot runner in which the gate for the molding material flowing from the hot runner into the cavity is maintained open. For example, JP-A-2012-20472 discloses a hot runner apparatus including a fixed die, a movable die, and an open-gate hot runner nozzle attached to the fixed die.

In an injection molding apparatus of related art that injects a molding material from a hot runner into a cavity and performs injection molding, such as that disclosed in JP-A-2012-20472, a space is formed between the fixed die and the hot runner. The space is intended to prevent heat from being dissipated from the hot runner to the fixed die or suppress damage to the hot runner due to interference between the hot runner and the fixed die that occurs when the fixed die is attached. The thus configured injection molding apparatus has typically injected resin from the hot runner before the injection molding to deliver the resin into the space to form a resin cap and then performs the injection molding. To form a resin cap in the space, however, it not only takes time to form the resin cap but takes a waiting period until the resin of the resin cap solidifies. Therefore, in the thus configured injection molding apparatus of related art, the period associated with the injection molding prolongs, resulting in a decrease in productivity in some cases.

SUMMARY

An injection molding apparatus according to an aspect of the present disclosure for solving the problems described above include a fixed die including a gate via which a molding material flows in, a movable die that forms along with the fixed die a cavity and separates from the fixed die at a point of time of mold opening, an open-gate hot runner that includes a nozzle including a channel that guides the molding material to the gate and a heater that heats the channel, the hot runner being attachable to and detachable from the fixed die, and a cap member that is disposed between the fixed die and the hot runner and has a melting point higher than a melting point of the molding material.

BRIEF DESCRIPTION OF THE DRAWINGS

FIG. 13 is a step diagram showing the procedure of an injection molding method carried out by using the injection molding apparatus according to Reference Example.

DESCRIPTION OF EXEMPLARY EMBODIMENTS

Figure 1:
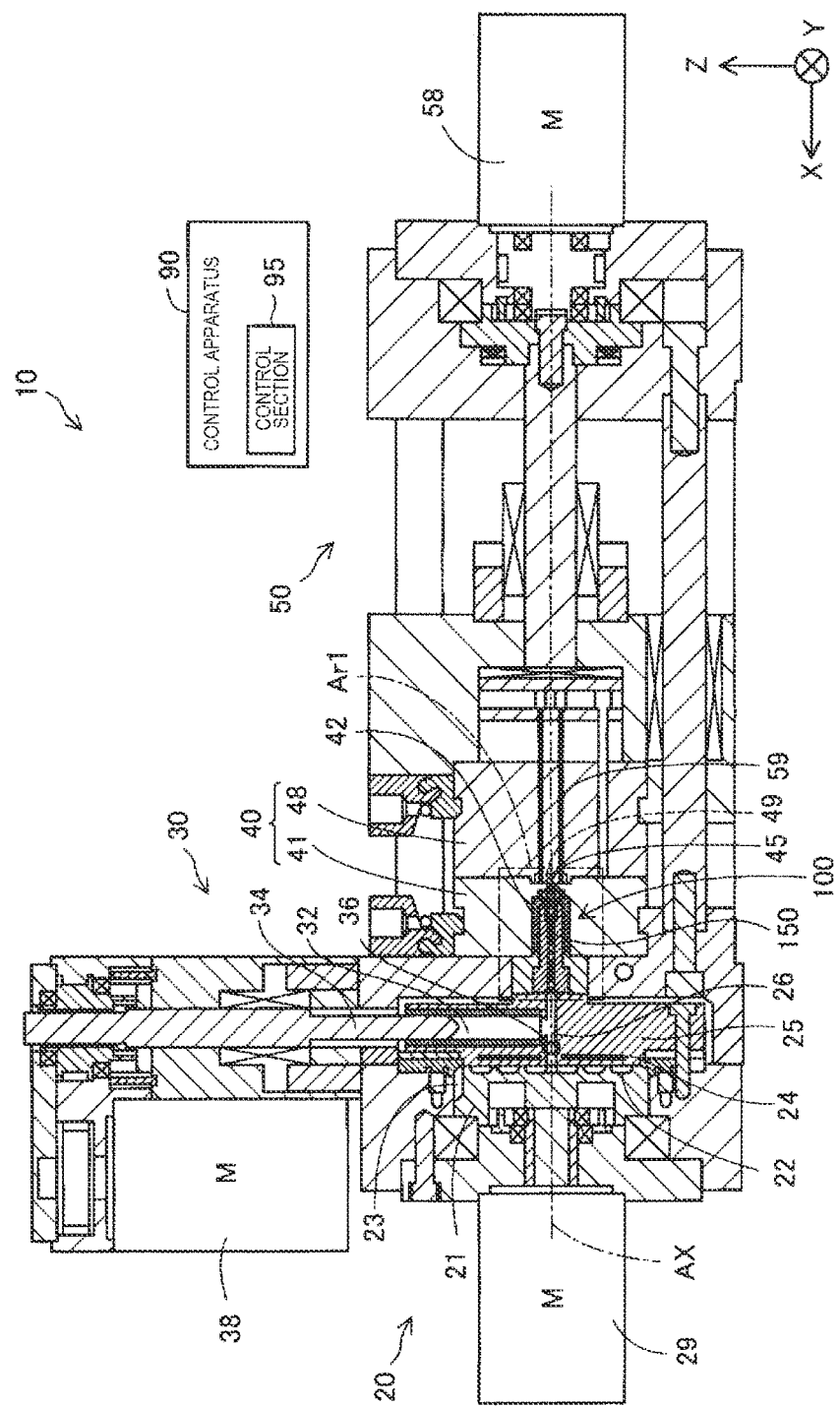
FIG. 1 is a cross-sectional view showing a schematic configuration of an injection molding apparatus according to Example 1 of the present disclosure.

The present disclosure will first be schematically described.

An injection molding apparatus according to a first aspect of the present disclosure for solving the problems described above includes a fixed die including a gate via which a molding material flows in, a movable die that forms along with the fixed die a cavity and separates from the fixed die at a point of time of mold opening, an open-gate hot runner that includes a nozzle including a channel that guides the molding material to the gate and a heater that heats the channel, the hot runner being attachable to and detachable from the fixed die, and a cap member that is disposed between the fixed die and the hot runner and has a melting point higher than a melting point of the molding material.

According to the present aspect, in which the cap member is provided between the fixed die and the hot runner, formation of a resin cap in the space between the fixed die and the hot runner can be omitted, whereby the period associated with the injection molding can be shortened.

An injection molding apparatus according to a second aspect of the present disclosure is based on the first aspect described above. The nozzle has a plurality of nozzle openings in a circumferential direction of the nozzle. A front end surface of the nozzle and the gate form a gate opening.

The gate opening has a ring-like shape when viewed in a first direction from the fixed die toward the movable die.

According to the present aspect, the molding material is allowed to flow out via the plurality of nozzle openings, which serve as a flow-out port via which the molding material flows out, to the ring-shaped gate. In the open-gate hot runner, which generally includes no shutter mechanism, the draining of the molding material tends to be poor at the end of the injection, but the ring-shaped gate can suppress the degree of the poor draining of the molding material at the end of the injection.

An injection molding apparatus according to a third aspect of the present disclosure is based on the first or second aspect described above, in which a coefficient of thermal expansion of the cap member is smaller than a coefficient of thermal expansion of the nozzle.

According to the present aspect, the coefficient of thermal expansion of the cap member is smaller than the coefficient of thermal expansion of the nozzle. When the coefficient of thermal expansion of the cap member is smaller than the coefficient of thermal expansion of the nozzle, expansion of the cap member between the fixed die and the hot runner can be avoided, whereby no cap member sneaks to the rear side of the nozzle.

An injection molding apparatus according to a fourth aspect of the present disclosure is based on any one of the first to third aspects described above, in which a thermal conductivity of the cap member is smaller than a thermal conductivity of the fixed die.

According to the present aspect, the thermal conductivity of the cap member is smaller than the thermal conductivity of the fixed die. When the thermal conductivity of the cap member is smaller than the thermal conductivity of the fixed die, dissipation of heat from the nozzle to the fixed die via the cap member can be suppressed, whereby the molding temperature can be lowered, and solidification of the molding material, for example, in the channel of the nozzle can be suppressed.

An injection molding apparatus according to a fifth aspect of the present disclosure is based on any one of the first to fourth aspects described above, in which a thermal conductivity of the cap member is smaller than a thermal conductivity of the molding material.

According to the present aspect, the thermal conductivity of the cap member is smaller than the thermal conductivity of the molding material. When the thermal conductivity of the cap member is smaller than the thermal conductivity of the molding material, dissipation of heat from the molding material to the cap member can be suppressed, whereby the molding temperature can be lowered, and solidification of the molding material, for example, in the channel of the nozzle can be suppressed.

An injection molding apparatus according to a sixth aspect of the present disclosure is based on any one of the first to fifth aspects described above, and a clearance between the cap member and the nozzle is smaller than a clearance between the cap member and the fixed die.

According to the present aspect, the clearance between the cap member and the nozzle is smaller than the clearance between the cap member and the fixed die. The configuration described above allows the fixed die to be readily attached and detached.

An injection molding apparatus according to a seventh aspect of the present disclosure is based on any one of the first to sixth aspects described above, and the cap member contains at least one of ceramic, metal, polyether ether ketone, and polybenzimidazole.

According to the present aspect, the cap member contains at least one of ceramic, metal, polyether ether ketone, and polybenzimidazole. Forming the cap member by using any of the materials described above allows production of a robust cap member having satisfactory performance.

An injection molding apparatus according to an eighth aspect of the present disclosure is based on any one of the first to seventh aspect described above. The injection molding apparatus further includes a control section that controls injection of the molding material via the nozzle and a temperature of the heater, the control section, when stopping injecting the molding material via the nozzle, lowers a temperature of the heater as compared with the temperature at a point of time of injection of the molding material via the nozzle.

According to the present aspect, the control section, when stopping injecting the molding material via the nozzle, lowers the temperature of the heater as compared with the temperature at the time of injection of the molding material via the nozzle. The viscosity of the molding material can therefore be increased when the injection is stopped, whereby leakage of the molding material via the nozzle can be suppressed when the injection is stopped.

An injection molding apparatus according to a ninth aspect of the present disclosure is based on any one of the first to eighth aspects described above. The injection molding apparatus further includes a plasticizer that plasticizes a solid material to generate the molding material, and the plasticizer includes a drive motor, a screw that is rotated by a rotating shaft the drive motor and has a groove formation surface where a spiral groove is formed, a barrel having a facing surface that faces the groove formation surface and provided with a through hole, and a heating section that heats at least one of the screw and the barrel.

According to the present aspect, providing the plasticizer, which plasticizes the molding material, allows the molding material to be injected in a preferable form. The thus configured plasticizer allows effective plasticization of the molding material.

A cap member according to a tenth aspect of the present disclosure is a cap member used in an injection molding apparatus including a fixed die including a gate via which a molding material flows in, a movable die that forms along with the fixed die a cavity and separates from the fixed die at a point of time of mold opening, and an open-gate hot runner that includes a nozzle including a channel that guides the molding material to the gate and a heater that heats the channel, the hot runner being attachable to and detachable from the fixed die. The cap member is disposed between the fixed die and the hot runner, and the cap member has a melting point higher than a melting point of the molding material.

According to the present aspect, the cap member can be disposed between the fixed die and the hot runner. Formation of a resin cap in the space between the fixed die and the hot runner can therefore be omitted, whereby the period associated with the injection molding can be shortened.

An embodiment according to the present disclosure will be described below with reference to the accompanying drawings.

Example 1

Overall Configuration of Injection Molding Apparatus

FIG. 1 is a cross-sectional view showing a schematic configuration of an injection molding apparatus 10 according to Example 1. FIG. 1 diagrammatically shows the cross section of the injection molding apparatus 10 taken along the vertical direction out of the cross sections containing an axial line AX of a channel 150 formed in a hot runner 100. FIG. 1 shows axes X, Y, and Z perpendicular to one another, and the direction +Z corresponds to the upward vertical direction. The axial line AX is parallel to the axis X. The axes X, Y, and Z in FIG. 1 correspond to the axes X, Y, and Z, respectively, in the other figures. The injection molding apparatus 10 injects a molding material, such as thermoplastic resin, into a die to manufacture a molded article. The injection molding apparatus 10 includes a material generator 20, an injector 30, an injection molding die 40, a die opener/closer 50, and a control apparatus 90.

The material generator 20 plasticizes or melts at least part of a solid material supplied from a hopper that is not shown but is disposed on the upper side in the vertical direction to generate a molding material having fluidity and supplies the generated molding material toward the injector 30. The solid material is loaded into the hopper in the form of a pellet, powder, or any of a variety of other granular forms. The material generator 20 includes a flat screw 21, a barrel 25, and a drive motor 29.

The flat screw 21 has a substantially circular columnar external appearance having a length along the axial line AX smaller than the diameter of the circular columnar shape. The flat screw 21 is so disposed that the axial line AX of the channel 150 formed in the hot runner 100 coincides with the axial line AX of the flat screw 21. Grooves 22 are formed in an end surface 11 of the flat screw 21 that is the end surface facing the barrel 25, and material flow-in ports 23 are formed in the outer circumferential surface of the flat screw 21. The grooves 22 continuously extend to the material flow-in ports 23. The material flow-in ports 23 accept the solid material supplied from the hopper.

Figure 2:
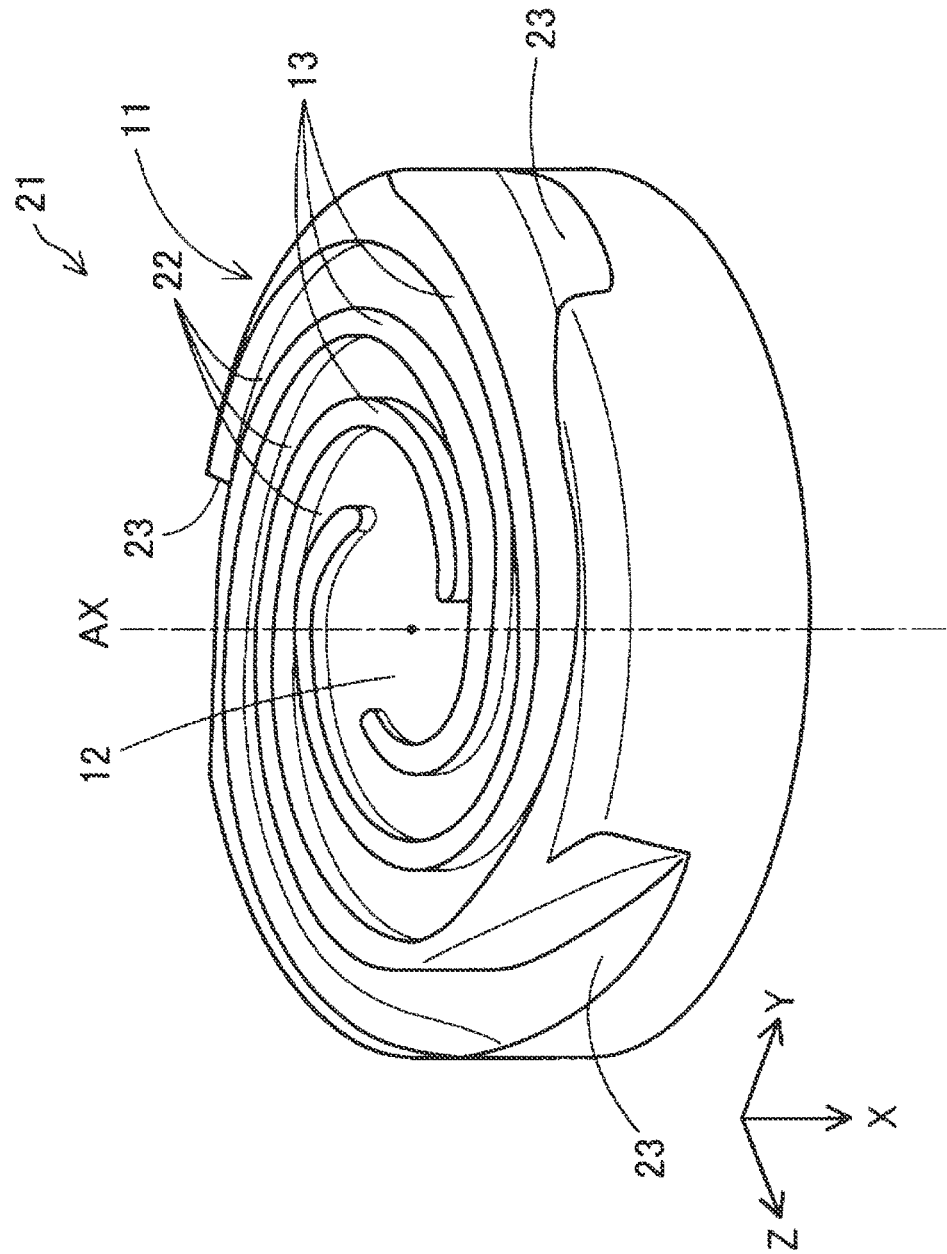
FIG. 2 is a schematic perspective view showing the configuration of a flat screw in the injection molding apparatus according to Example 1 of the present disclosure.

FIG. 2 is a schematic perspective view showing the configuration of the end surface 11 of the flat screw 21. A central section 12 of the end surface 11 of the flat screw 21 is configured in the form of a recess to which one end of each of the grooves 22 is connected. The central section 12 faces a through hole 26 of the barrel 25 shown in FIG. 1. In the present example, the central section 12 intersects the axial line AX. The grooves 22 of the flat screw 21 are each formed of what is called a scroll groove and formed in the form of a vortex that draws an arc from the central section, where the axial line AX is located, toward the outer circumferential surface of the flat screw 21. The grooves 22 may each instead be configured in the form of a spiral. The end surface 11 is provided with protrusions 13, which form the side walls of the grooves 22 and extend along the grooves 22.

Three grooves 22 and three protrusions 13 are formed at the end surface 11 of the flat screw 21 in the present example, and the number of grooves and protrusions is not limited to three, and an arbitrary number of grooves and protrusions, such as one groove 22 and one protrusion 13 or two or more grooves 22 and protrusions 13, may be formed. An arbitrary number of protrusions 13 may be provided in accordance with the number of grooves 22. Three material flow-in ports 23 are formed in the outer circumferential surface of the flat screw 21 in the present example along the circumferential direction at equal intervals. The number of material flow-in ports 23 is not limited to three, and one, two or more, or arbitrary number of material flow-in ports 23 may be formed even at intervals different from one another instead of equal intervals.

The barrel 25 shown in FIG. 1 has a substantially disc-shaped external appearance and is so disposed as to face the end surface 11 of the flat screw 21. A heater 24 as a heating section for heating the material is buried in the barrel 25. The through hole 26, which passes through the barrel 25 along the axial line AX, is formed in the barrel 25. The through hole 26 functions as a channel that guides the molding material to the hot runner 100. An injection cylinder 32, which passes through the barrel 25 along an axis perpendicular to the axial line AX, is formed in the barrel 25. The injection cylinder 32 forms part of the injector 30 and communicates with the through hole 26.

Figure 3:
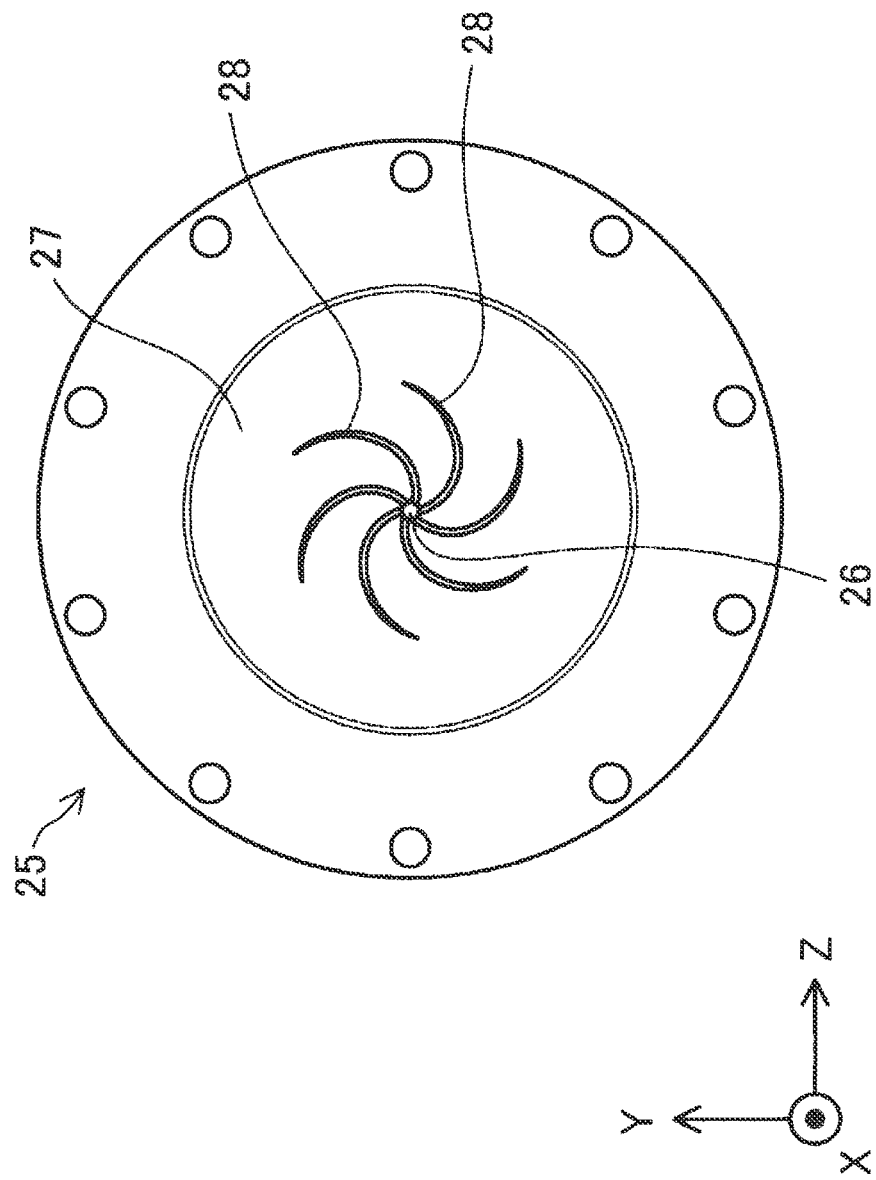
FIG. 3 is a schematic plan view showing the configuration of a barrel in the injection molding apparatus according to Example 1 of the present disclosure.

FIG. 3 is a schematic plan view showing the configuration of the barrel 25. FIG. 3 shows a screw facing surface 27, which is so disposed as to face the end surface 11 of the flat surface 21, out of the surfaces of the barrel 25. The through hole 26 is formed at the center of the screw facing surface 27. A plurality of guide grooves 28, which are connected to the through hole 26 and extend spirally from the through hole 26 toward the outer circumference of the screw facing surface 27, are formed in the screw facing surface 27. The plurality of guide grooves 28 have the function of guiding the molding material having flowed into the central section 12 of the flat screw 21 into the through hole 26. In the present example, the plurality of guide grooves 28 are provided, as described above, but no guide groove 28 may be provided.

The drive motor 29 shown in FIG. 1 is connected to an end surface of the flat screw 21 that is the end surface opposite the side facing the barrel 25. The drive motor 29 is driven in accordance with an instruction from a control section 95 and rotates the flat screw 21 around the axial line AX as the axis of rotation.

At least part of the material supplied via the material flow-in ports 23 is transported and guided to the through hole 26 while heated in the grooves 22 of the flat screw 21 by a heating member of the barrel 25 and plasticized or melted by the rotation of the flat screw 21 so that the fluidity of the material is increased. The rotation of the flat screw 21 also achieves compression and degassing of the molding material. The term "plasticization" means that a material having thermal plasticity is heated to a temperature higher than or equal to the glass transition point of the material so that it softens and achieves fluidity. The term "melting" means not only that a material having thermal plasticity is heated to a temperature higher than or equal to the melting point of the material so that the material liquefies but that the material having thermal plasticity is plasticized.

The injector 30 measures the weight of the molding material supplied from the material generator 20 and injects the molding material into the cavity 49 formed in a movable die 48 of the injection molding die 40. The injector 30 includes the injection cylinder 32, an injection plunger 34, a check valve 36, an injection motor 38, and the hot runner 100.

The injection cylinder 32 is so formed in the barrel 25 as to have a substantially cylindrical shape and communicates with the through hole 26. The injection plunger 34 is so disposed as to be slidable in the injection cylinder 32. When the injection plunger 34 slides upward in the vertical direction, the molding material in the through hole 26 is drawn into the injection cylinder 32 and measured in terms of weight. When the injection plunger 34 slides downward in the vertical direction, the molding material in the injection cylinder 32 is forcibly fed toward the hot runner 100 and injected into the cavity 49. The check valve 36 is disposed in the through hole 26 in a position shifted toward the flat screw 21 from the portion where the injection cylinder 32 communicates with the through hole 26. The check valve 36 allows the molding material to flow from the flat screw 21 toward the hot runner 100 and suppresses reverse flow of the molding material from the hot runner 100 toward the flat screw 21. When the injection plunger 34 slides downward in the vertical direction, a spherical valve element provided in the check valve 36 moves toward the flat screw 21 to block the through hole 26. The injection motor 38 is drive in accordance with an instruction from the control section 95 and causes the injection plunger 34 to slide in the injection cylinder 32. The speed at which the injection plunger 34 slides and the amount of slide of the injection plunger 34 are set in advance in accordance, for example, with the type of the molding material and the size of the cavity 49. The hot runner 100 has the function of guiding the heated molding material into the cavity 49.

The injection molding die 40 includes a fixed die 41 and the movable die 48. A hot runner attachment hole 42, which passes through the fixed die 41 along the axial line AX, is formed in the fixed die 41. The hot runner 100 is disposed in the hot runner attachment hole 42.

Figure 4:
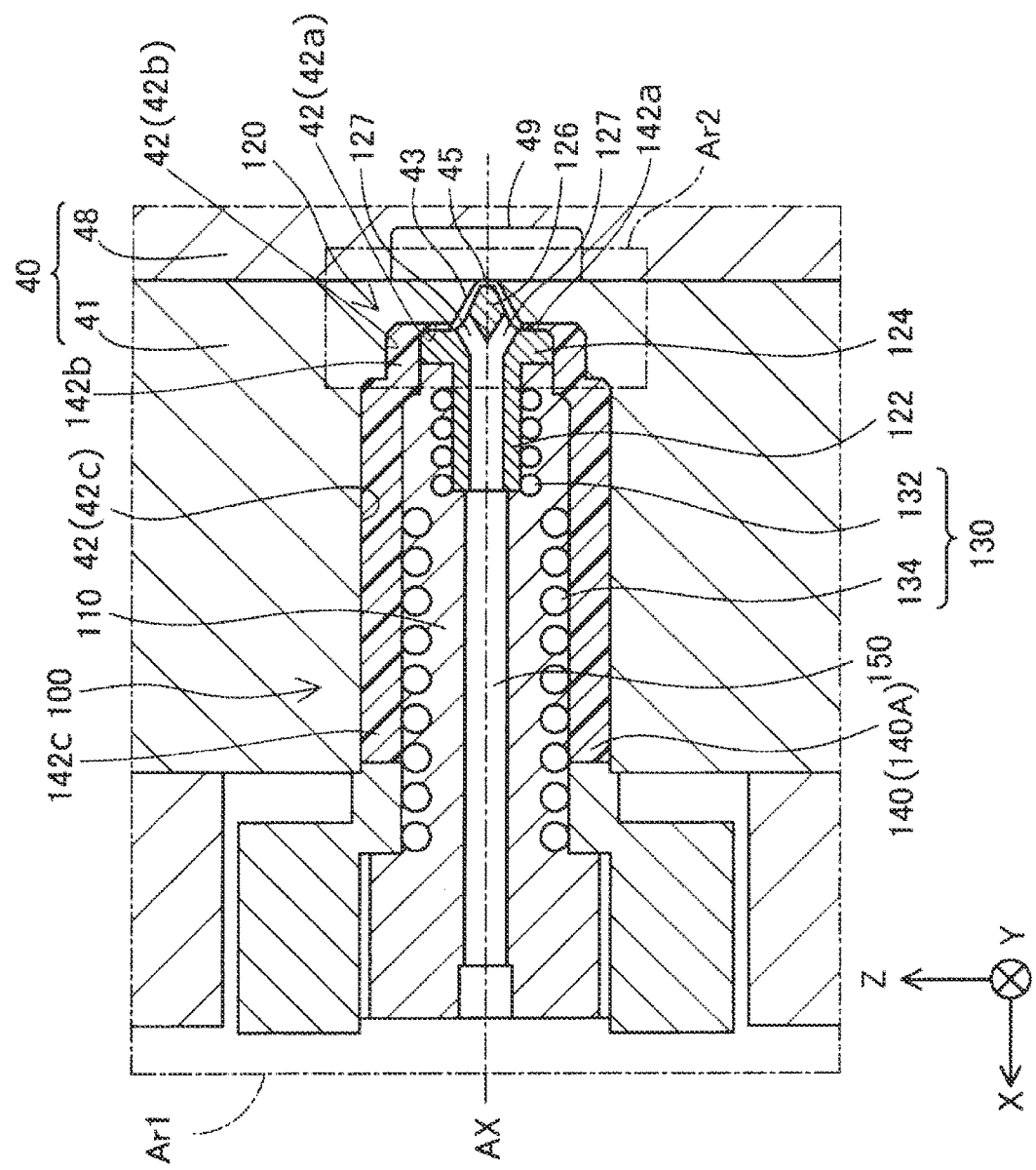
FIG. 4 is a cross-sectional view for describing a nozzle and therearound in the injection molding apparatus according to Example 1 of the present disclosure and is an enlarged view showing an area Ar1 in FIG. 1.

FIG. 4 is an enlarged cross-sectional view showing an area Ar1 in FIG. 1. The hot runner attachment hole 42 is so formed that the inner diameter thereof decreases stepwise from the material generator 20 side. An end section 43 of the hot runner attachment hole 42 that is an end section opposite the material generator 20 is formed in a substantially conical shape having an inner diameter that gradually decreases. A front end of the end section 43 functions as a gate opening 45, via which the molding material flows in. The gate opening 45 is configured as a substantially circular hole. A gate 150a (see FIG. 5) in the vicinity of the gate opening 45 has what is called a ring-gate-based open gate structure.

The movable die 48 shown in FIGS. 1 and 4 is so disposed as to face the fixed die 41. The movable die 48 comes into contact with the fixed die 41 at the time of mold closing or clamping including the injection or cooling of the molding material and separates from the fixed die 41 at the time of mold opening including the molded article release. When the fixed die 41 and the movable die 48 come into contact with each other, the cavity 49, which communicates with the gate opening 45, is formed between the fixed die 41 and the movable die 48. The cavity 49 is so designed in advance as to have the shape of the molded article to be molded in the injection molding. In the present example, the cavity 49 is so formed as to be directly continuous with the gate opening 45 and may instead be so formed as to be continuous with the gate opening 45 via a runner.

In the present example, the injection molding die 40 is made of invar. Invar is characterized in that the coefficient of thermal expansion thereof is very small. A coolant channel that is not shown is formed in the injection molding die 40. Causing a coolant, such as cooling water, to flow along the coolant channel maintains the temperature of the injection molding die 40 at a temperature lower than the temperature at which the resin melts, whereby the molding material injected into the cavity 49 is cooled and hardens. The coolant is caused to flow at the time of both the mold clamping and mold opening. The cooling and hardening of the molding material may instead be archived by using an arbitrary cooler, such as a Peltier device, in place of the coolant flowing through the coolant channel.

The die opener/closer 50 shown in FIG. 1 opens and closes the fixed die 41 and the movable die 48. The die opener/closer 50 includes a die opening/closing motor 58 and an ejector pin 59. The die opening/closing motor 58 is driven in accordance with an instruction from the control section 95 and moves the movable die 48 along the axial line AX. The mold closing, mold clamping, and mold opening of the injection molding die 40 are thus achieved. The ejector pin 59 is disposed in a position that communicates with the cavity 49. The ejector pin 59 pushes the molded article at the time of mold opening to separate the molded article from the die.

The control apparatus 90 controls the action of the entire injection molding apparatus 10 to cause the injection molding 10 to perform the injection molding. The control apparatus 90 is formed of a computer including a CPU, a storage, and an input/output interface. The CPU executes a control program stored in the storage in advance to function as the control section 95. The control section 95 controls the temperature of a heater 130 buried in the hot runner 100 to adjust the temperature of the hot runner 100. A user of the injection molding apparatus 10 can set a variety of parameters relating to the injection molding conditions, such as the set temperature of the heater 130, by operating a controller that is the input/output interface of the control apparatus 90.

The hot runner 100 guides the heated molding material supplied from the injector 30 to the gate opening 45. The hot runner 100 is disposed in the hot runner attachment hole 42 in the fixed die 41. The hot runner 100 includes a main body 110, a nozzle 120, and the heater 130, as shown in FIG. 4. The injection molding apparatus 10 includes a cap member 140. The cap member 140 will be described later in detail.

The main body 110 has a substantially cylindrical external appearance. A female thread that is not shown is formed around an inner circumferential surface of an end portion of the main body 110 that is the end portion facing the gate opening 45. The nozzle 120 is fixed to an end of the hot runner 100 that is the end facing the gate opening 45. The nozzle 120 includes a connection section 122, a flange section 124, and a front end section 126. The connection section 122 is located at the side facing the material generator 20 and has a substantially cylindrical external appearance. A male thread that is not shown is formed around the outer circumferential surface of the connection section 122. The male thread engages with the female thread formed on the main body 110 to fix the nozzle 120 to the main body 110. The flange section 124 has an outer diameter greater than the outer diameter of the connection section 122 and is continuous with the connection section 122. An end surface of the flange section 124 that is the end surface facing the material generator 20 is in contact with an end surface of the main body 110 that is the end surface facing the gate opening 45. The front end section 126 is continuous with the flange section 124 and has a substantially conical external appearance that protrudes toward the gate opening 45.

The channel 150 extending along the axial line AX is formed in the main body 110 and the nozzle 120. The channel 150 has the function of guiding the molding material to the gate opening 45. The channel 150 bifurcates into nozzle openings 127 formed in the front end section 126 of the nozzle 120. The nozzle opening 127 faces the end section 43 of the hot runner attachment hole 42. In the present example, two nozzle openings 127, which are arranged at equal intervals in the circumferential direction, are formed in the front end section 126, and the number of nozzle openings 127 is not limited to two and may, for example, be four or any arbitrary number. The structure described above allows the channel 150 to have a ring-like shape around the front end section 126 between the front end section 126 and the end section 43 when viewed along the direction of the axial line AX. The gate opening 45 is therefore formed of the open gate structure, which is also called what is called a ring gate.

In the open gate structure, the channel 150 is not blocked even when the molding material hardens, and the gate opening 45 is kept open.

In the present example, the main body 110 and the nozzle 120 are made of aluminum. Aluminum is characterized by a relatively large coefficient of thermal expansion and a relatively large thermal conductivity.

The heater 130 is formed of a coil heater buried in the main body 110 and heats the hot runner 100. The temperature of the heater 130 is controlled by the control section 95. The heating performed by the heater 130 maintains the melted state of the molding material flowing through the channel 150. The heater 130 includes a first heater 132 and a second heater 134. The first heater 132 is so disposed around the nozzle 120 as to surround the connection section 122 and heats the nozzle 120. The second heater 134 is so disposed as to be separate from the nozzle 120 than the first heater 132. In the present example, the second heater 134 is disposed in an outer circumferential portion of the main body 110 that is a portion shifted from the nozzle 120 toward the material generator 20. The first heater 132 and the second heater 134 are each not limited to a coil heater and may be formed of an arbitrary heater, such as a band heater.

Figure 5:
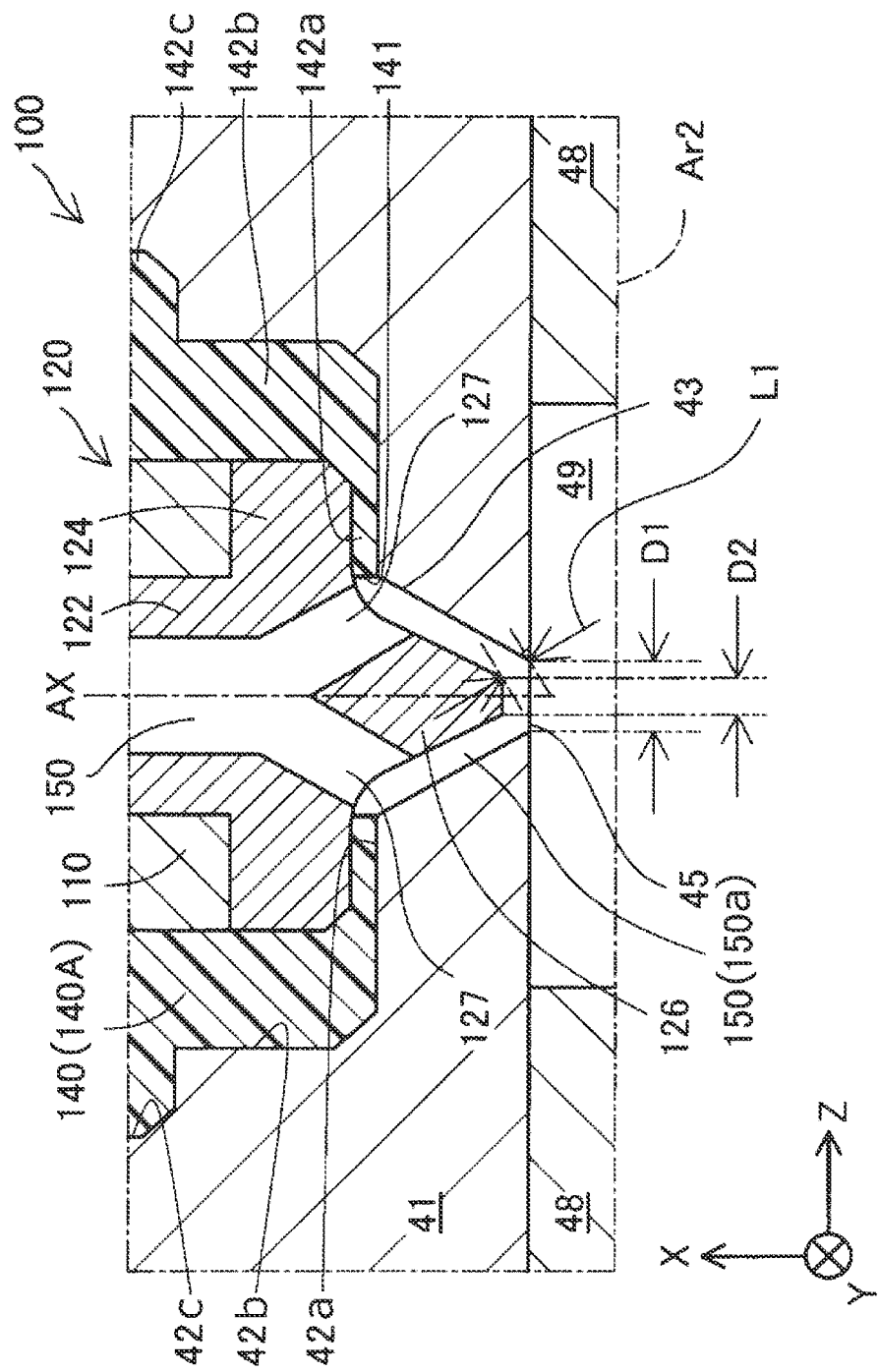
FIG. 5 is a cross-sectional view for describing the dimensions of a gate opening and therearound in the injection molding apparatus according to Example 1 of the present disclosure.

FIG. 5 is a cross-sectional view for describing the dimensions of the gate opening 45 and therearound. FIG. 5 is an enlarged diagrammatic view showing an area Ar2 in FIG. 4. The dimensions shown below mean dimensions at a controlled temperature used when the molding material is injected from the hot runner 100 into the cavity 49. In the present example, a diameter D1 of the gate opening 45 around the axial line AX is set at about 0.2 mm. A diameter D2 of the front end section 126 of the nozzle 120 around the axial line AX is set at about 0.05 mm. A minimum dimension L1, which is the smallest dimension of the gap between the front end section 126 of the nozzle 120 and the gate opening 45, is set at about 0.05 mm. In the present example, the gap between the front end section 126 of the nozzle 120 and the gate opening 45 means the gap between the front end section 126 of the nozzle 120 and the edge of the gate opening 45 formed in the fixed die 41.

Injection Molding Material

The material used in the injection molding apparatus 10 will be described. In the injection molding apparatus 10, for example, a variety of materials, such as a material having thermal plasticity, a metal material, and a ceramic material, can be used as the primary material to perform the injection molding. The "primary material" means a main material that forms the shape of a molded article and means a material the content of which is at least 50 weight percent of the molded article. The molding material described above contains such a primary material alone in the melted form or a mixture of a primary material and an additive part of which forms melted paste.

When a material having thermal plasticity as the primary material is used, the material generator 20 plasticizes the material to generate a molding material. The term "plasticization" means that a material having thermal plasticity is heated and melted.

The material having thermal plasticity may, for example, be a thermally plastic resin material that is one selected from the materials below or the combination of two or more thereof. Examples of the thermally plastic resin material are listed as follows: polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified-polyphenylene ether, polybutylene terephthalate; polyethylene terephthalate, and other general-purpose engineering plastics; and polysulfone, polyether sulfone, polyphenylene sulfide, polyarylate, polyimide, polyamide imide; polyether imide, polyether ether ketone, and other engineering plastics.

The material having thermal plasticity may be mixed with pigment, metal, ceramic, or any other substance. The material having thermal plasticity may further be mixed with wax, a flame retardant, an antioxidant, a heat stabilizer, or any other additive. The material having thermal plasticity may still further be mixed with carbon fibers, glass fibers, cellulose fibers, aramid fibers, or any other fibers.

It is desirable that the material having thermal plasticity is heated to a temperature higher than or equal to the glass transition point thereof to be completely melted and then injected via the nozzle 120 of the hot runner 100. For example, ABS resin having a glass transition point of about 120° C. may be injected at about 200° C. as a first temperature, which will be described later.

The injection molding apparatus 10 may use, for example, a metal material as the primary material in place of any of the materials having thermal plasticity described above. It is desirable in this case that a powdery material that is any of metal materials below in the form of powder is mixed with a component that melts when the molding material is generated and the mixture is supplied to the material generator 20. Examples of the metal material are listed as follows: magnesium (Mg), iron (Fe), cobalt (Co), chromium (Cr), aluminum (Al), titanium (Ti), copper (Cu), nickel (Ni), and other single metals; and an alloy containing at least one of the metals. Examples of the alloy are next listed below: maraging steel; stainless steel; cobalt chromium molybdenum; titanium alloy; nickel alloy; aluminum alloy; cobalt alloy; and cobalt chromium alloy.

The injection molding apparatus 10 may use a ceramic material as the primary material in place of any of the metal materials described above. As the ceramic material, for example, silicon dioxide, titanium dioxide, aluminum oxide, zirconium oxide, or any other oxide ceramic, aluminum nitride, or any other non-oxide ceramic can be used.

The metal or ceramic powdery material to be supplied to the material generator 20 may be a mixture material that is a mixture of a plurality of types of single metal powder, alloy powder, and ceramic material powder. The metal or ceramic powdery material may be coated, for example, with any of the thermally plastic resins described above by way of example or any other thermally plastic resin. In this case, the thermally plastic resin may melt and achieve fluidity in the material generator 20.

A solvent may, for example, be added to the metal or ceramic powder material to be supplied to the material generator 20. The solvent can be one selected from the solvents below or the combination of two or more thereof. Examples of the solvent are listed as follows: water, ethylene glycol monomethyl ether, ethylene glycol monoethyl ether, propylene glycol monomethyl ether, propylene glycol monoethyl ether, and other (poly)alkylene glycol monoalkyl ethers; ethyl acetate, n-propyl acetate, iso-propyl acetate, n-butyl acetate, iso-butyl acetate, and other acetic esters; benzene, toluene, xylene, and other aromatic hydrocarbons; methyl ethyl ketone, acetone, methyl isobutyl ketone, ethyl n-butyl ketone, diisopropyl ketone, acetyl acetone, and other ketones; ethanol, propanol, butanol, or any other alcohols; tetraalkylammonium acetates; dimethyl sulfoxide, diethyl sulfoxide, and other sulfoxide-based solvents; pyridine, γ-picoline, 2,6-lutidine, and other pyridine-based solvents; tetraalkylammonium acetate (for example, tetrabutylammonium acetate), butyl carbitol acetate, and other ionic liquids.

In addition to the above, a binder, for example, can also be added to the metal or ceramic powder material to be supplied to the material generator 20. Examples of the binder are listed as follows: acrylic resin, epoxy resin, silicone resin, cellulose-based resin, and other synthetic resin; and PLA (polylactic acid), PA (polyamide), PPS (polyphenylene sulfide), PEEK (polyether ether ketone), and other thermally plastic resins.

Cap Member

The injection molding apparatus 10 according to the present example is characterized in that it includes the cap member 140 (cap member 140A). The cap member 140A in the present example is located in a position shifted from the end section 43 to the material generator 20 in the gap between the main body 110/the nozzle 120 and the hot runner attachment hole 42. The cap member 140A suppresses transmission of the heat from the hot runner 100 to the fixed die 41. A cap member having a melting point higher than the melting point of the molding material is used as the cap member 140A.

Figure 6:
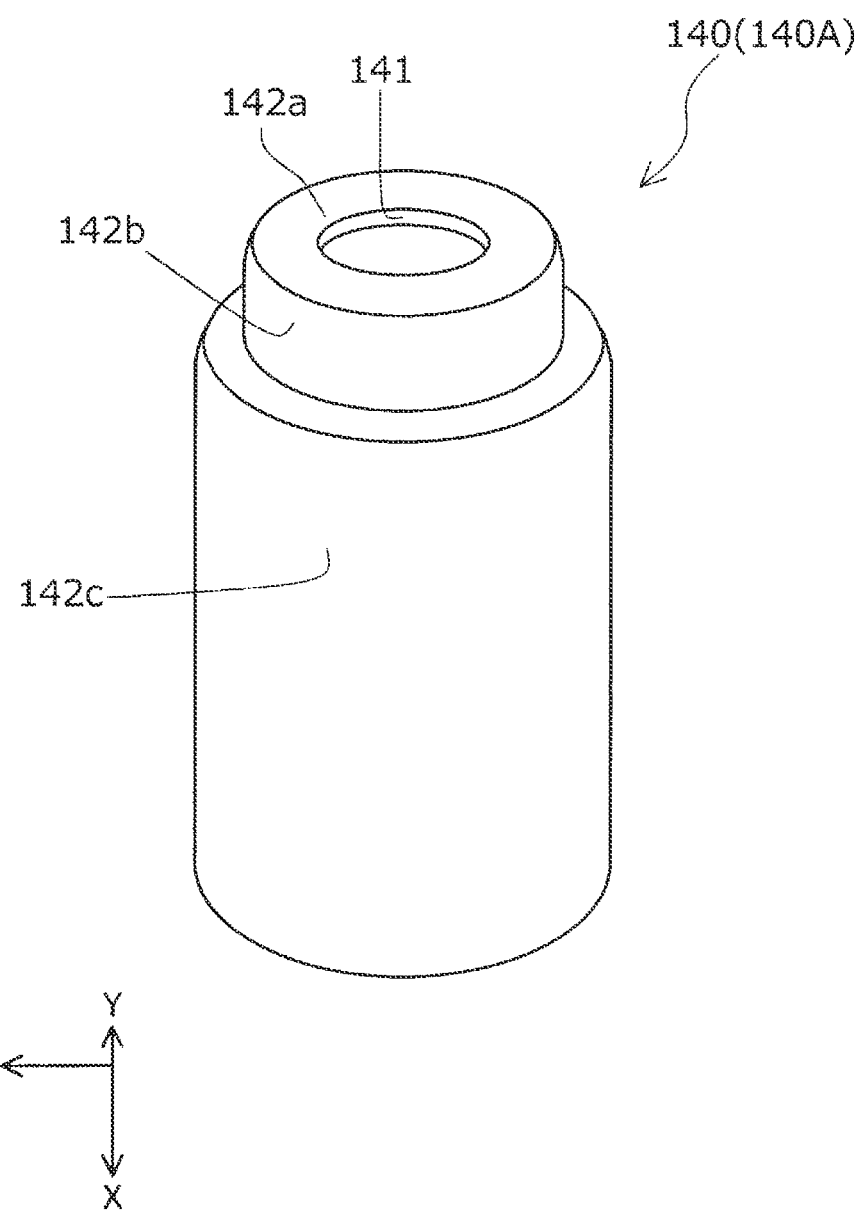
FIG. 6 is a schematic perspective view showing a cap member in the injection molding apparatus according to Example 1 of the present disclosure.

The cap member 140A includes a first cylindrical area 142*c*, which has a cylindrical shape and extends along a protruding direction (−X direction) from the base end of the nozzle 120 toward the front end thereof, a second cylindrical area 142*b*, which has a cylindrical shape, is so provided as to be adjacent to the −X-direction-side end of the first cylindrical area 142*c*, and has a diameter smaller than the diameter of the first cylindrical area 142C, and a third cylindrical area 142*a*, which is so provided as to be adjacent to the second cylindrical area 142*b* and form an inner portion of the −X-direction end of the second cylindrical area 142*b*, as shown in FIGS. 4 to 6. The first cylindrical area 142*c* is disposed in a base end side area 42*c* in the hot runner attachment hole 42, the second cylindrical area 142*b* is disposed in a front end side area 42*b* in the hot runner attachment hole 42, and the third cylindrical area 142*a* is disposed in an inner area 42*a* in the hot runner attachment hole 42, as shown in FIGS. 4 and 5.

Since the cap member 140A is configured as described above, the molding material having flowed out via the nozzle openings 127 comes into contact with the inner wall surface of the third cylindrical area 142*a*. That is, in the cap member 140A, the inner wall surface of the third cylindrical area 142*a* is a contact surface 141, which comes into contact with the molding material. The cap member 140A receives force from the molding material when the molding material flows out via the nozzle openings 127, and the direction of the force is the circumferential direction of the nozzle 120. The "circumferential direction of the nozzle 120" means the circumferential direction of the nozzle 120 around the center thereof (axial line AX) viewed along the protruding direction (−X direction) from the base end of the nozzle 120 toward the front end thereof. Since the cap member 140A receives force from the molding material when the molding material flows out via the nozzle openings 127 becomes the circumferential direction of the nozzle 120, a situation in which the nozzle 120 receives force from the molding material along the direction in which the nozzle 120 buckles (+X direction) can be suppressed.

Injection Molding Method

Figure 12:
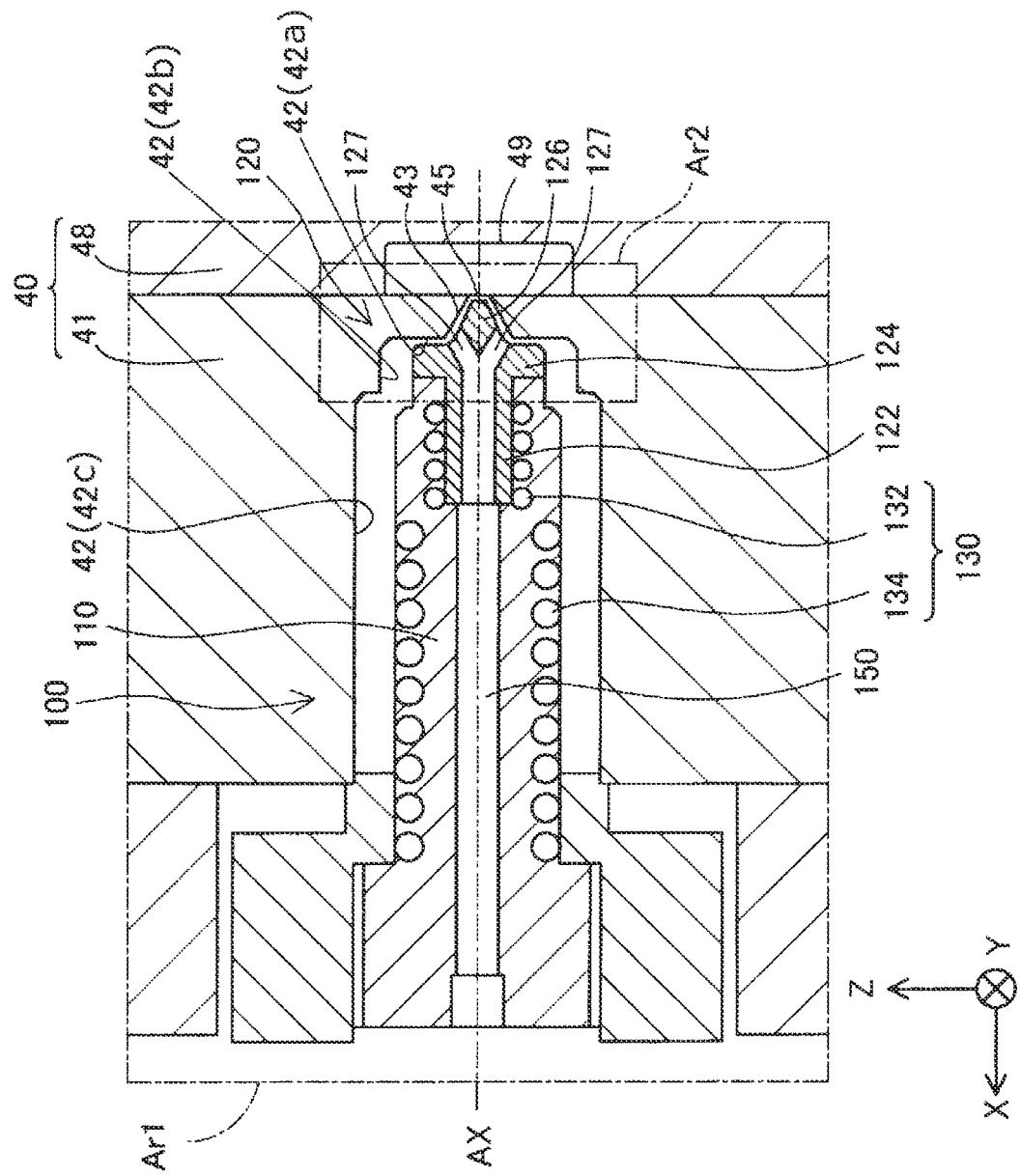
FIG. 12 is a cross-sectional view for describing a nozzle and therearound in an injection molding apparatus according to Reference Example.

A specific example of an injection molding method using the injection molding apparatus 10 according to the present example will be described below with reference to the flowchart shown in FIG. 7. To compare the injection molding method using the injection molding apparatus 10 according to the present example with an injection molding method using an injection molding apparatus according to Reference Example, which is shown in FIG. 12 and in which no cap member 140 is provided will also be described with reference to the flowchart shown in FIG. 13.

Figure 7:
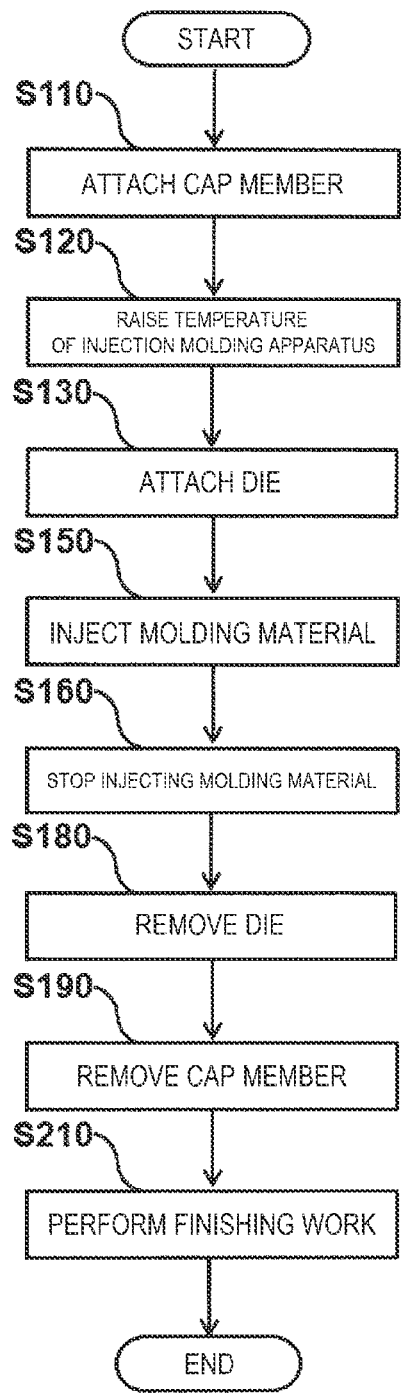
FIG. 7 is a step diagram showing the procedure of an injection molding method carried out by using the injection molding apparatus according to Example 1 of the present disclosure.

In the injection molding method shown in FIG. 7 using the injection molding apparatus 10 according to the present example, the cap member 140A is first attached to the injection molding apparatus 10 in step S110. The period required to carry out step S110 is about one minute.

The temperature of the injection molding apparatus 10 is then raised in step S120. Specifically, for example, the heater 130 is powered on. The period required to carry out step S120 is about ten minutes.

The fixed die 41 and the movable die 48, which form a die, are then attached to the injection molding apparatus 10 in step S130. The period required to carry out step S130 is about five minutes.

Injection of the molding material is then initiated to start the injection molding in step S150. When a desired molded article is completed, the injection molding is terminated by stopping the injection of the molding material in step S160. The period required to perform the injection molding varies in accordance with the size and shape of the molded article and other factors.

The fixed die 41 and the movable die 48, which form a die, are then removed from the injection molding apparatus 10 in step S180. The period required to carry out step S180 is about five minutes.

The cap member 140A is then removed from the injection molding apparatus 10 in step S190. The period required to carry out step S190 is about one minute.

Finishing work is then finally performed in step S210. The period required to carry out step S210 is about five minutes.

The injection molding method using the injection molding apparatus according Reference Example, which is shown in FIG. 12 and in which no cap member 140 is provided, will be described below with reference to the flowchart shown in FIG. 13. The injection molding method shown in the flowchart shown in FIG. 13 is the same as the injection molding method shown in the flowchart shown in FIG. 7 except that steps S110 and S190 are omitted but steps S140, S170, and S200, which will be described below in detail, are provided. The steps excluding steps S140, S170, and S200 will therefore not be described below.

In the injection molding method using the injection molding apparatus 10 according Reference Example shown in FIG. 13, the resin cap is produced in step S140. Specifically, the molding material in the state shown in FIG. 12 is injected and introduced into the space between the fixed die 41 and the hot runner 100 in the hot runner attachment hole 42. The period required to carry out step S140 is about two minutes.

In step S170, after the molding is completed, a waiting period is provided until the resin cap produced in step S140 solidifies. The reason for this is that the molded resin cap is fluid and cannot therefore be removed in step 200, which will be described later, until the resin cap solidifies. The period required to carry out step S170 is about ten minutes.

In step S200, the solidified resin cap is removed from the injection molding apparatus 10. The period required to carry out step S200 is about one minute.

As described above, in the injection molding method using the injection molding apparatus 10 according to the present example shown in FIG. 7, the period excluding the period required for the injection molding is about 27 minutes in total. On the other hand, in the injection molding method using the injection molding apparatus 10 according to Reference Example shown in FIG. 13, the period excluding the period required for the injection molding is about 38 minutes in total. As described above, instead of carrying out the injection molding method using the injection molding apparatus 10 according to Reference Example shown in FIG. 13, carrying out the injection molding method using the injection molding apparatus 10 according to the present example shown in FIG. 7 allows the period required to manufacture one molded article to be shortened by at least 10 minutes. That is, for example, in a case where a plurality of molded articles are continuously molded, the overall period required to perform the injection molding can be greatly shortened.

As a temporary overview, the injection molding apparatus 10 according to the present example includes the fixed die 41, which includes the gate 150a (see FIG. 5), via which the molding material flows in, and the movable die 48, which forms along with the fixed die 41 the cavity 49 and separates from the fixed die 41 at a point of time of mold opening. The injection molding apparatus 10 further includes the open-gate hot runner 100, which includes the nozzle 120, which includes the channel 150, which guides the molding material to the gate 150a, and the heater 130, which heats the channel 150, and is attachable to and detachable from the fixed die 41. The injection molding apparatus 10 still further includes the cap member 140A, which is disposed between the fixed die 41 and the hot runner 100 and has a melting point higher than the melting point of the molding material. As described above, the injection molding apparatus 10 according to the present example includes the cap member 140 between the fixed die 41 and the hot runner 100 and can therefore omit formation of a resin cap in the space between the fixed die 41 and the hot runner 100. The period associated with the injection molding can therefore be shortened. Since the cap member 140 having a melting point higher than the melting point of the molding material is formed, the cap member 140 will not melt, whereby a decrease in the precision of the injection molding can be suppressed. Employing the open-gate hot runner 100 can simplify the configuration of the injection molding apparatus.

In a description from the viewpoint of the cap member 140, the cap member 140A in the present example is used in the injection molding apparatus 10 including the fixed die 41, which includes the gate 150a, via which the molding material flows in, the movable die 48, which forms along with the fixed die 41 the cavity 49 and separates from the fixed die 41 at a point of time of mold opening, and the open-gate hot runner 100, which includes the nozzle 120, which includes the channel 150, which guides the molding material to the gate 150a, and the heater 130, which heats the channel 150, and is attachable to and detachable from the fixed die 41, and the cap member 140 is disposed between the fixed die 41 and the hot runner 100 and has a melting point higher than the melting point of the molding material. The thus configured cap member 140 can be disposed between the fixed die 41 and the hot runner 100. Formation of a resin cap in the space between the fixed die 41 and the hot runner 100 can therefore be omitted, whereby the period associated with the injection molding can be shortened.

In the injection molding apparatus 10 according to the present example, the nozzle 120 has the plurality of nozzle openings 127 in the circumferential direction of the nozzle 120. The front end surface of the nozzle 120 and the gate 150a form the gate opening 45. The gate opening 45 has a ring-like shape when viewed in a first direction (−X direction) from the fixed die 41 toward the movable die 48. The configuration described above allows the molding material to flow out via the plurality of nozzle openings 127, which serve as the flow-out port via which the molding material flows out, to the ring-shaped gate 150a. In the open-gate hot runner, which generally includes no shutter mechanism, the draining of the molding material tends to be poor at the end of the injection, but the ring-shaped gate 150a can suppress the degree of the poor draining of the molding material at the end of the injection.

As described above, the injection molding apparatus 10 according to the present example includes the control section 95, and the control section 95 controls the injection of the molding material via the nozzle 120 and the temperature of the heater 130. The control section 95, when stopping injecting the molding material via the nozzle 120, can lower the temperature of the heater 130 as compared with the temperature at the time of the injection of the molding material via the nozzle 120. The viscosity of the molding material can therefore be increased when the injection is stopped, whereby leakage of the molding material via the nozzle 120 can be suppressed when the injection is stopped.

As described above, the injection molding apparatus 10 according to the present example includes the material generator 20 as a plasticizer that plasticizes a solid material to generate the molding material. The material generator 20 includes the drive motor 29 and flat screw 21, which is rotated by the rotating shaft of the drive motor 29 and has the end surface 11, which is a groove formation surface in which the grooves 22, which are spiral grooves, are formed, as shown in FIG. 2. The material generator 20 further includes the barrel 25, which has a screw facing surface 27 facing the end surface 11 and is provided with the through hole 26, as shown in FIG. 3. The material generator 20 further includes the heater 24 as a heating section that heats the barrel 25, as shown in FIG. 1. Providing the plasticizer, which plasticizes the molding material, allows the molding material to be injected in a preferable form. The thus configured plasticizer, such as the material generator 20 described above, allows effective plasticization of the molding material. The injection molding apparatus 10 according to the present example includes the heating section, which heats the barrel 25, and may instead be configured to include a heat section that heats the flat screw 21.

In the present disclosure, the clearance between the cap member 140 and the nozzle 120 and the clearance between the cap member 140 and the fixed die 41 are not each limited to a specific clearance, but the clearance between the cap member 140 and the nozzle 120 is preferably smaller than the clearance between the cap member 140 and the fixed die 41. The reason for this is that the configuration described above allows the fixed die 41 to be readily attached and detached.

The material of the cap member 140 is not limited to a specific material and preferably contains at least one of ceramic, metal, polyether ether ketone, and polybenzimidazole. Forming the cap member 140 by using any of the materials described above allows production of a robust cap member having satisfactory performance. The phrase "contains at least one of" means that a plurality of the materials described above by way of example may be contained and also means that any of the materials described above by way of example and another material may be contained.

The coefficient of thermal expansion of the cap member 140 is preferably smaller than the coefficient of thermal expansion of the nozzle 120. When the coefficient of thermal expansion of the cap member 140 is smaller than the coefficient of thermal expansion of the nozzle 120, expansion of the cap member 140 between the fixed die 41 and the hot runner 100 can be avoided, whereby no cap member 140 sneaks to the rear side of the nozzle (in −X direction).

The thermal conductivity of the cap member 140 is preferably smaller than the thermal conductivity of the fixed die 41. The reason for this is that when the thermal conductivity of the cap member 140 is smaller than the thermal conductivity of the fixed die 41, dissipation of the heat from the nozzle 120 to the fixed die 41 via the cap member 140 can be suppressed, whereby the molding temperature can be lowered, and solidification of the molding material, for example, in the channel 150 of the nozzle 120 can be suppressed.

Further, the thermal conductivity of the cap member 140 is preferably smaller than the thermal conductivity of the molding material. The reason for this is that when the thermal conductivity of the cap member 140 is smaller than the thermal conductivity of the molding material, dissipation of the heat from the molding material to the cap member 140 can be suppressed, whereby the molding temperature can be lowered, and solidification of the molding material, for example, in the channel 150 of the nozzle 120 can be suppressed.

Example 2

Figure 8:
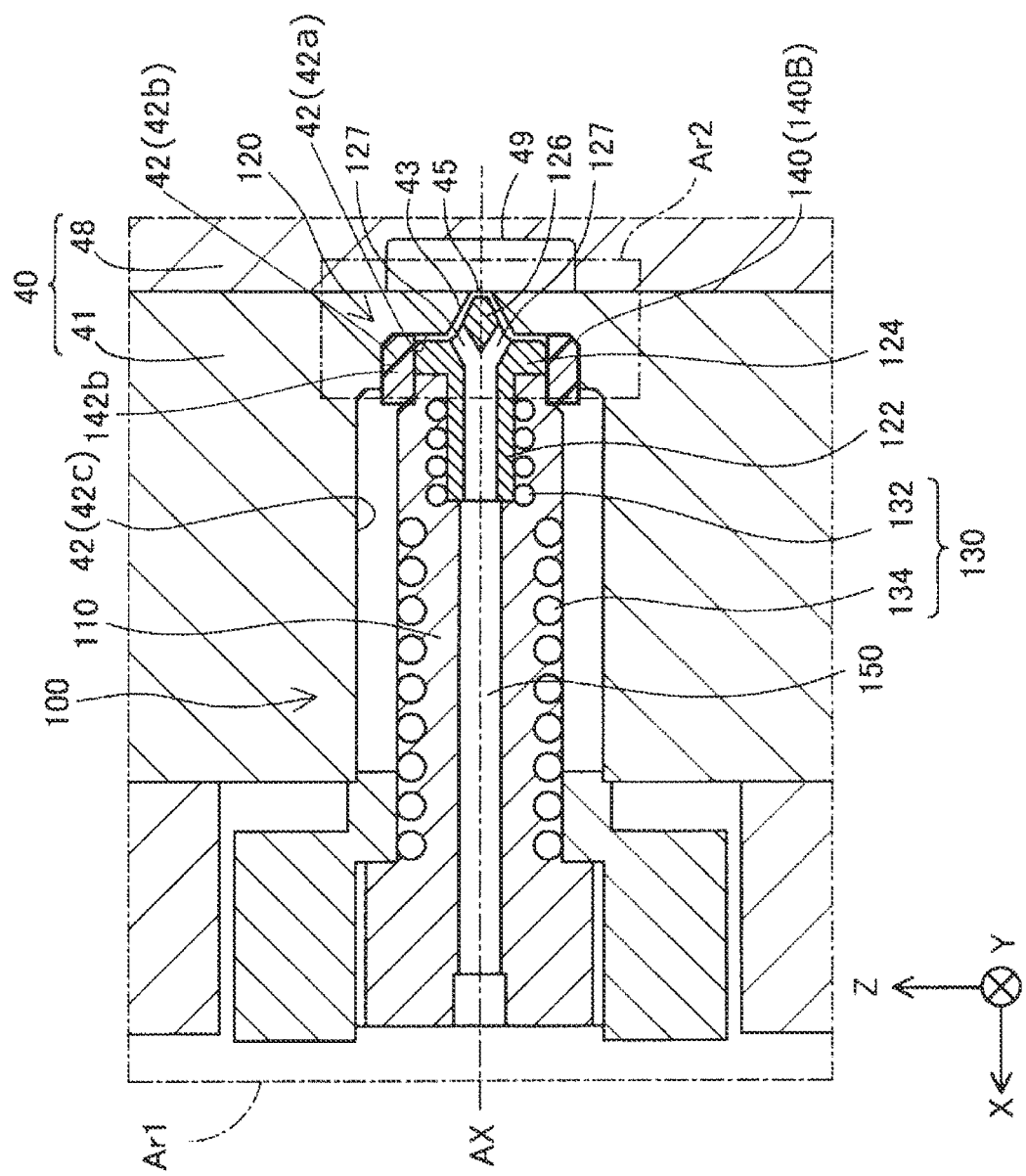
FIG. 8 is a cross-sectional view for describing a nozzle and therearound in an injection molding apparatus according to Example 2 of the present disclosure.

The injection molding apparatus 10 according to Example 2 will next be described with reference to FIGS. 8 and 9. FIG. 8 corresponds to FIG. 4 showing the injection molding apparatus 10 according to Example 1, and FIG. 9 corresponds to FIG. 6 showing the injection molding apparatus 10 according to Example 1. Constituent members in FIGS. 8 and 9 common to those in the Example 1 described above have the same reference characters, and no detailed description of the common constituent members will be made. The injection molding apparatus 10 according to the present example has the same configuration as that of the injection molding apparatus 10 according to Example 1 except for the shape of the cap member 140.

Figure 9:
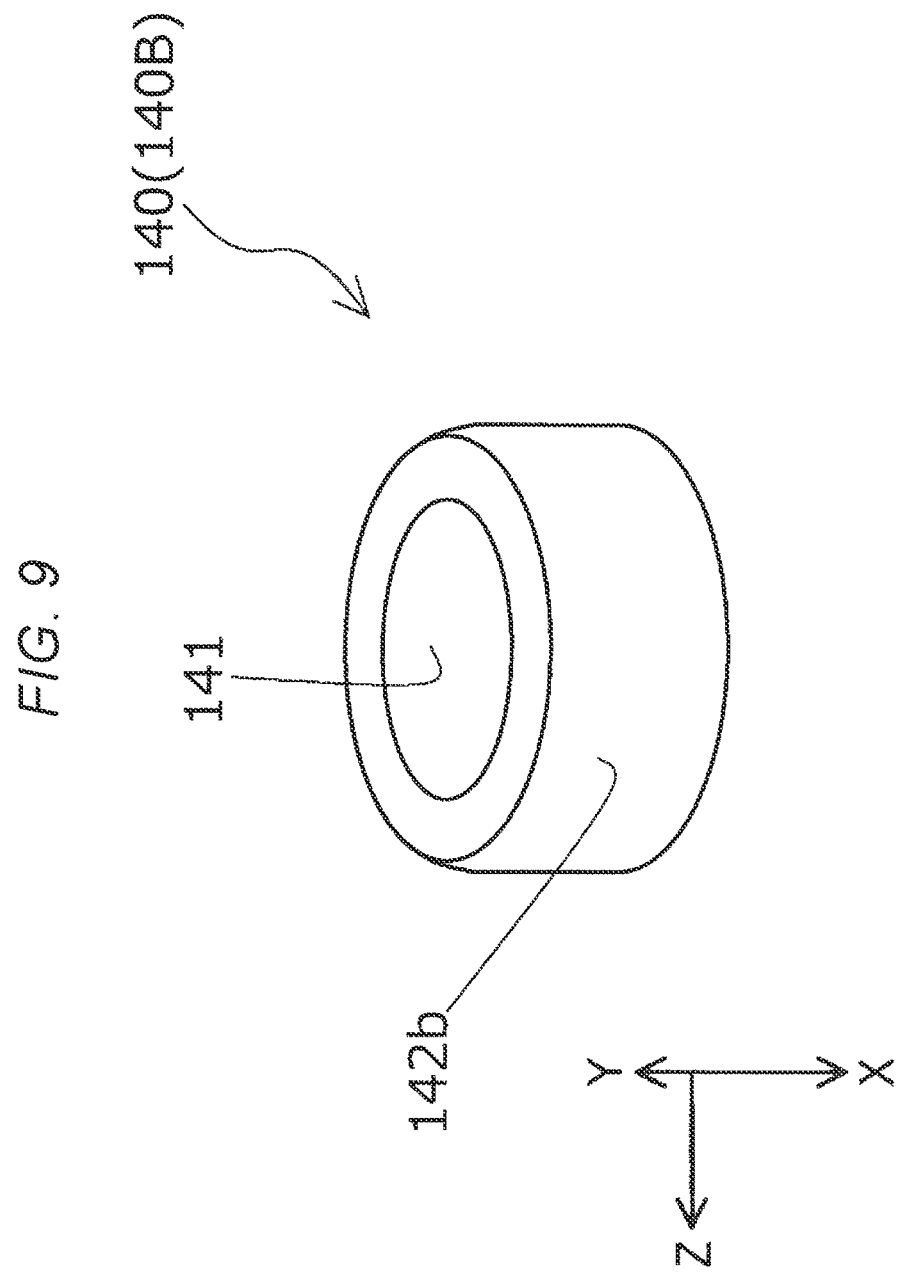
FIG. 9 is a schematic perspective view showing a cap member in the injection molding apparatus according to Example 2 of the present disclosure.

A cap member 140B of the injection molding apparatus 10 according to the present example is formed of the second cylindrical area 142b, which has a cylindrical shape, as shown in FIGS. 8 and 9. The second cylindrical area 142b is disposed in the front end side area 42b in the hot runner attachment hole 42, as shown in FIG. 8.

Since the cap member 140B has the configuration described above, the molding material having flowed out via the nozzle openings 127 comes into contact with the inner wall surface of the second cylindrical area 142b. That is, in the cap member 140B, the inner wall surface of the second cylindrical area 142b is the contact surface 141, which comes into contact with the molding material. The cap member 140B receives force from the molding material when the molding material flows out via the nozzle openings 127, and the direction of the force is the circumferential direction of the nozzle 120, as in the case of the cap member 140A in Example 1. Since the cap member 140B receives force from the molding material in the direction which the circumferential direction of the nozzle 120 when the molding material flows out via the nozzle openings 127 situation in which the nozzle 120 receives force from the molding material along the direction in which the nozzle 120 buckles (+X direction) can be suppressed. The thus configured cap member 140B allows reduction in material cost as compared with the cap member 140A in Example 1.

Example 3

The injection molding apparatus 10 according to Example 3 will next be described with reference to FIGS. 10 and 11.

Figure 10:
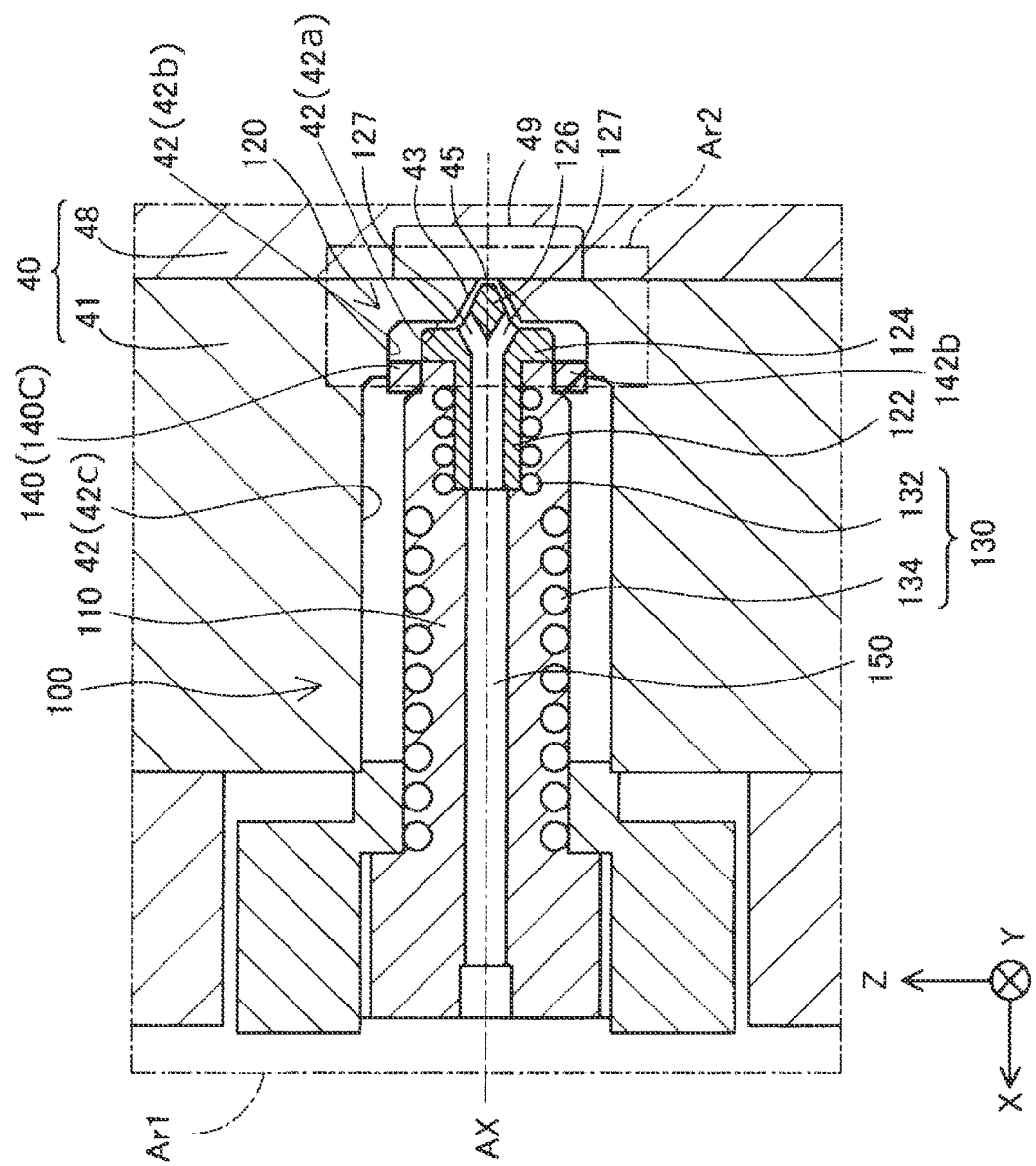
FIG. 10 is a cross-sectional view for describing a nozzle and therearound in an injection molding apparatus according to Example 3 of the present disclosure.
Figure 11:
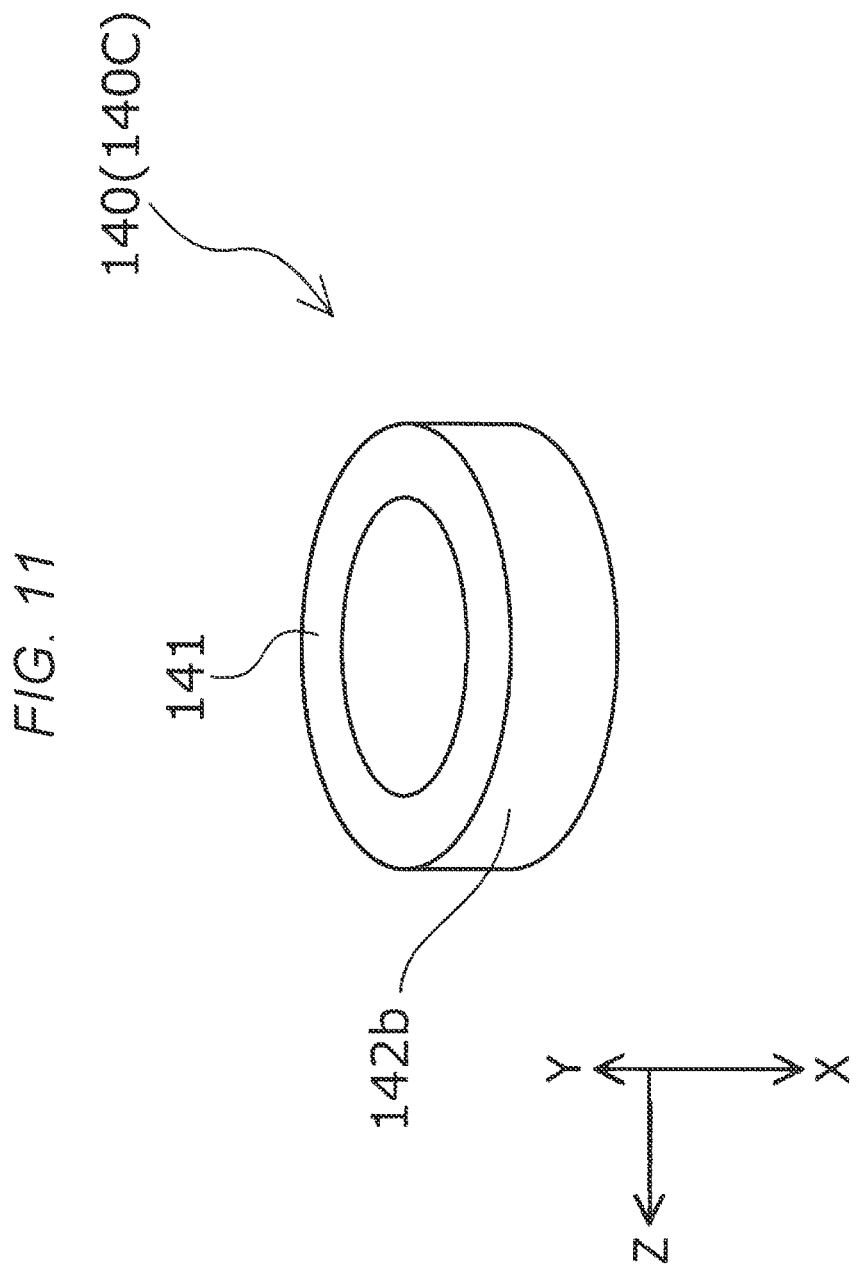
FIG. 11 is a schematic perspective view showing a cap member in the injection molding apparatus according to Example 3 of the present disclosure.

FIG. 10 corresponds to FIG. 4 showing the injection molding apparatus 10 according to Example 1, and FIG. 11 corresponds to FIG. 6 showing the injection molding apparatus 10 according to Example 1. Constituent members in FIGS. 10 and 11 common to those in the Examples 1 and 2 described above have the same reference characters, and no detailed description of the common constituent members will be made. The injection molding apparatus 10 according to the present example has the same configuration as those of the injection molding apparatuses 10 according to Examples 1 and 2 except for the shape of the cap member 140.

A cap member 140C of the injection molding apparatus 10 according to the present example is formed of the second cylindrical area 142b, which has a cylindrical shape, as shown in FIGS. 10 and 11. The second cylindrical area 142b is disposed on the +X-direction side in the front end side area 42b in the hot runner attachment hole 42, as shown in FIG. 10. The cap member 140C in the present example is thinner in the X-axis direction than the cap member 140B in Example 2, as will be seen by the comparison between FIGS. 8 and 10 and between FIGS. 9 and 11.

Since the cap member 140C has the configuration described above, the molding material having flowed out via the nozzle openings 127 comes into contact with the flat surface area of the second cylindrical area 142b. That is, in the cap member 140C, the flat surface area of the second cylindrical area 142b is the contact surface 141, which comes into contact with the molding material. The cap member 140C receives force from the molding material when the molding material flows out via the nozzle openings 127, and the direction of the force is therefore the direction in which the nozzle 120 buckles. The thus configured cap member 140C, however, allows reduction in material cost as compared with the cap member 140A in Example 1, further, the cap member 140B in Example 2.

The present disclosure is not limited to the examples described above and can be achieved in a variety of configurations to the extent that they do not depart from the substance of the present disclosure. The technical features in the examples corresponding to the technical features in the aspects described in the paragraph of Summary can be replaced with other technical features or combined with each other as appropriate to solve part or entirety of the problems described above or achieve part or entirety of the effects described above. Further, when any of the technical features has not been described as an essential feature in the present specification, the technical feature can be deleted as appropriate.

What is claimed is:

1. An injection molding apparatus comprising:
    a fixed die including a gate via which a molding material flows in;
    a movable die that forms along with the fixed die a cavity and separates from the fixed die at a point of time of mold opening;
    an open-gate hot runner in the fixed die, wherein the open-gate hot runner includes:
        a main body;
        a nozzle including a channel that guides the molding material to the gate, wherein the nozzle is disposed at an end portion of the main body; and
        a heater that heats the channel, the open-gate hot runner being attachable to and detachable from the fixed die; and
    a cap that is disposed between the fixed die and the open-gate hot runner and has a melting point higher than a melting point of the molding material, wherein the cap is in contact with each of the fixed die, the main body of the open-gate hot runner, and the nozzle.

2. The injection molding apparatus according to claim 1, wherein
the nozzle has a plurality of nozzle openings in a circumferential direction of the nozzle,
a front end surface of the nozzle and the gate form a gate opening,
the gate opening has a ring-like shape when viewed in a first direction from the fixed die toward the movable die, and
the molding material is filled into the cavity through the plurality of nozzle openings.

3. The injection molding apparatus according to claim 1, wherein a thermal conductivity of the cap is smaller than a thermal conductivity of the fixed die.

4. The injection molding apparatus according to claim 1, wherein a thermal conductivity of the cap is smaller than a thermal conductivity of the molding material.

5. The injection molding apparatus according to claim 1, wherein a clearance between the cap and the nozzle is smaller than a clearance between the cap and the fixed die.

6. The injection molding apparatus according to claim 1, wherein the cap contains at least one of ceramic, metal, polyether ether ketone, and polybenzimidazole.

7. The injection molding apparatus according to claim 1, further comprising a control section that controls injection of the molding material via the nozzle and a temperature of the heater,
wherein the control section, when stopping injecting the molding material via the nozzle, lowers the temperature of the heater as compared with the temperature at a point of time of injection of the molding material via the nozzle.

8. The injection molding apparatus according to claim 1, further comprising a plasticizer that plasticizes a solid material to generate the molding material, wherein the plasticizer includes
a drive motor,
a screw that is rotated by the drive motor and has a groove formation surface where a spiral groove is formed,
a barrel having a facing surface that faces the groove formation surface and provided with a through hole, and
a heating section that heats at least one of the screw and the barrel.

9. The injection molding apparatus according to claim 1, wherein a coefficient of thermal expansion of the cap is smaller than a coefficient of thermal expansion of the nozzle.

10. The injection molding apparatus according to claim 1, wherein the heater includes:
a first heater around the nozzle,
a second heater in an outer circumferential portion of the main body, and
the second heater is separate from the nozzle.

11. The injection molding apparatus according to claim 10, wherein
the nozzle includes:
a connection section;
a flange section; and
a front-end section,
the connection section is disposed inside the main body and fixed to the main body,
the flange section is continuous with the connection section and contacts the end portion of the main body,
the front-end section is continuous with the flange section and includes a nozzle opening, and
the first heater is disposed around the connection section of the nozzle.

12. A cap used in an injection molding apparatus including
a fixed die including a gate via which a molding material flows in;
a movable die that forms along with the fixed die a cavity and separates from the fixed die at a point of time of mold opening; and
an open-gate hot runner in the fixed die, wherein
the open-gate hot runner includes:
a main body;
a nozzle including a channel that guides the molding material to the gate, wherein the nozzle is disposed at an end portion of the main body; and
a heater that heats the channel, the open-gate hot runner being attachable to and detachable from the fixed die,
the cap is disposed between the fixed die and the open-gate hot runner,
the cap has a melting point higher than a melting point of the molding material, and
the cap is in contact with each of the fixed die, the main body of the open-gate hot runner, and the nozzle.

* * * * *